Dec. 8, 1970   F. BERNSHAUSEN   3,545,182
METHOD OF HARVESTING FRUIT
Filed Feb. 21, 1968   4 Sheets-Sheet 1

INVENTOR
FRITZ BERNSHAUSEN
BY Beall and Jones
ATTORNEYS

Dec. 8, 1970    F. BERNSHAUSEN    3,545,182
METHOD OF HARVESTING FRUIT
Filed Feb. 21, 1968    4 Sheets-Sheet 2
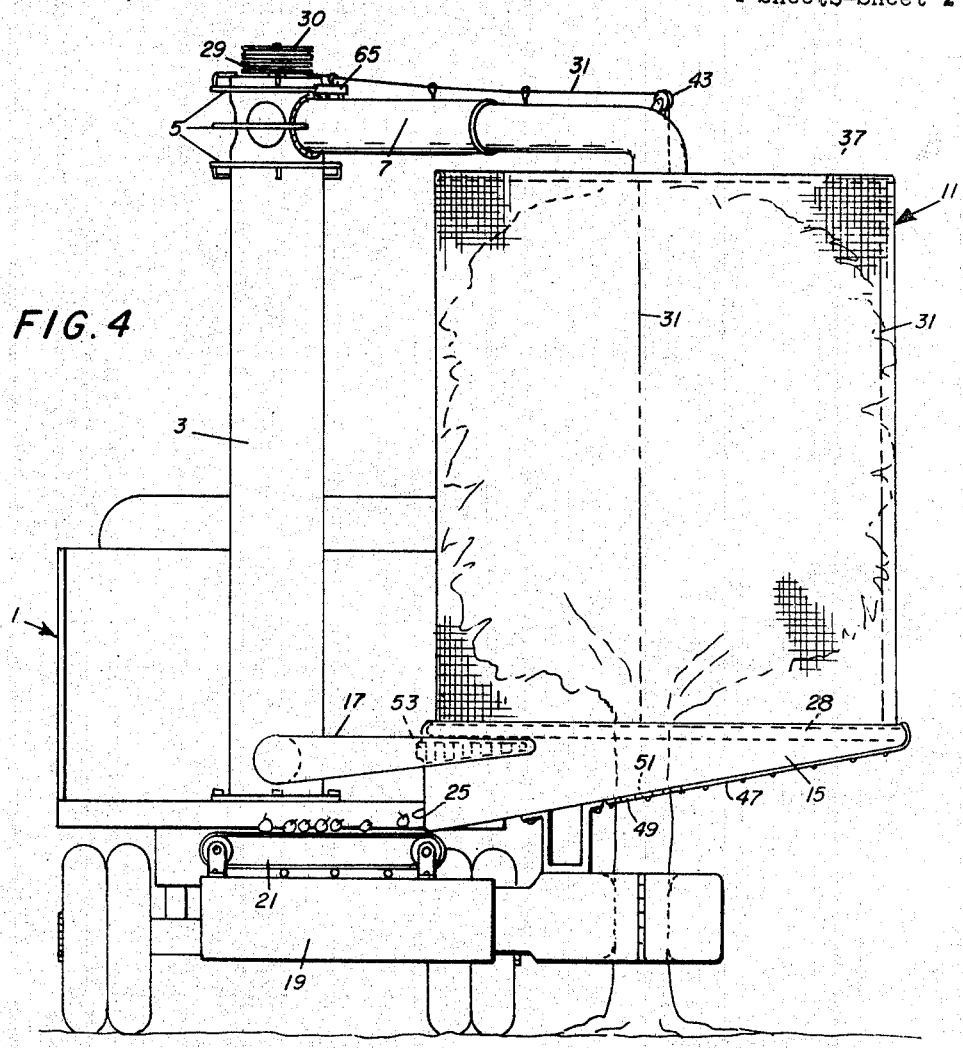
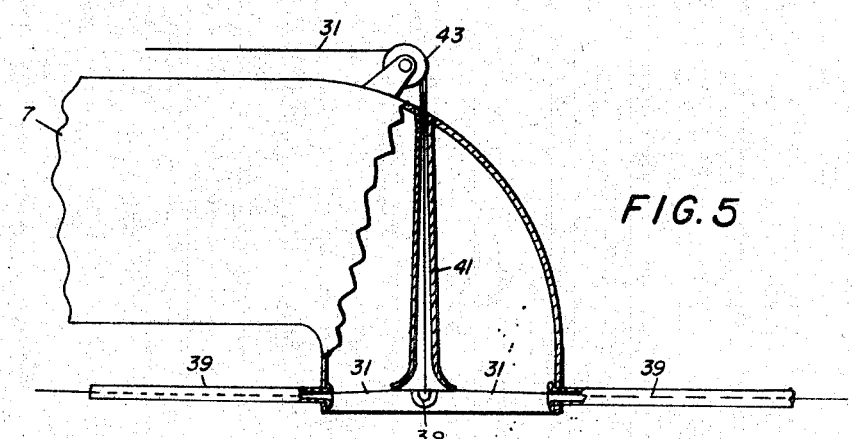
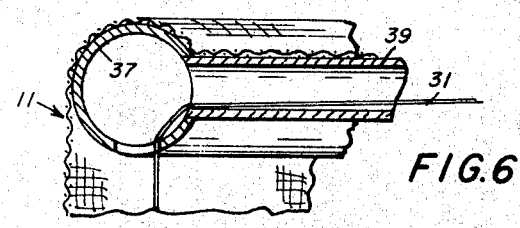
INVENTOR
FRITZ BERNSHAUSEN
BY Beale and Jones
ATTORNEYS

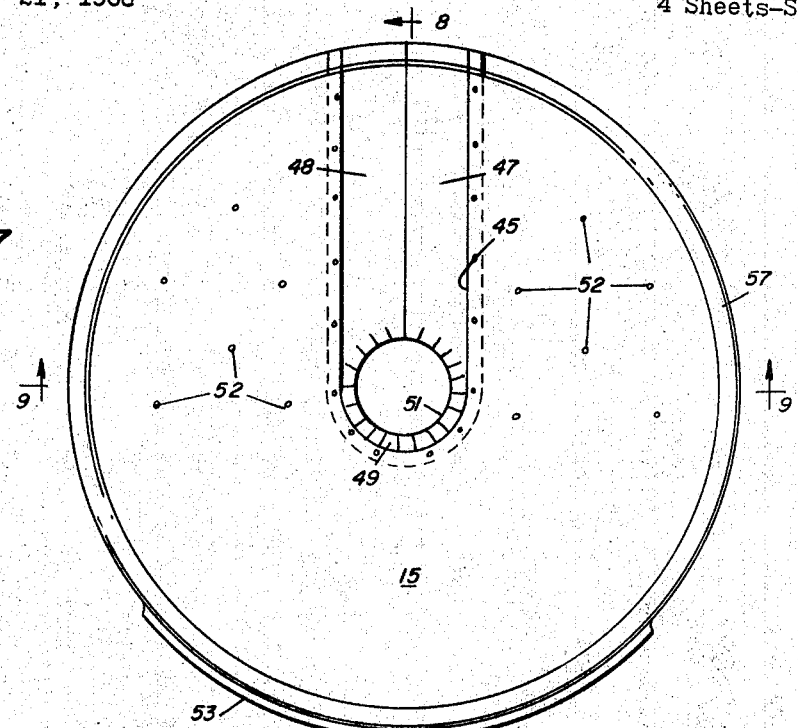
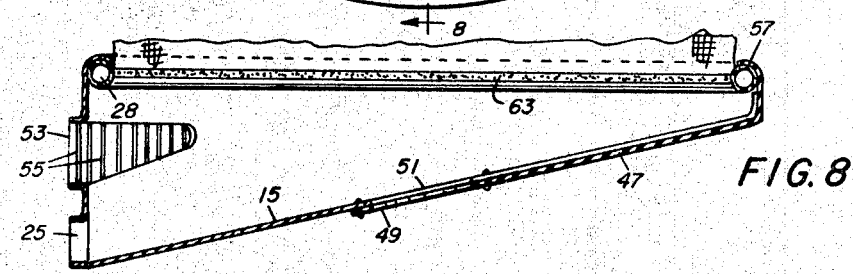
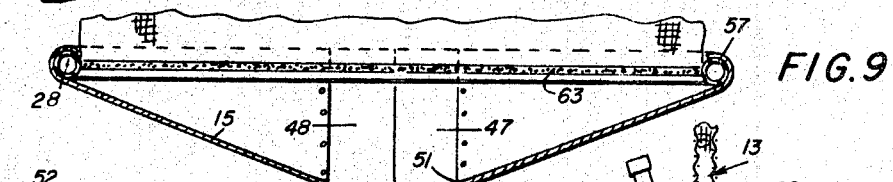
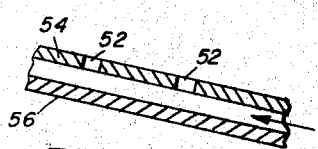
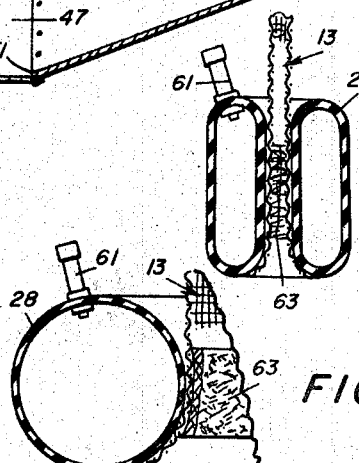
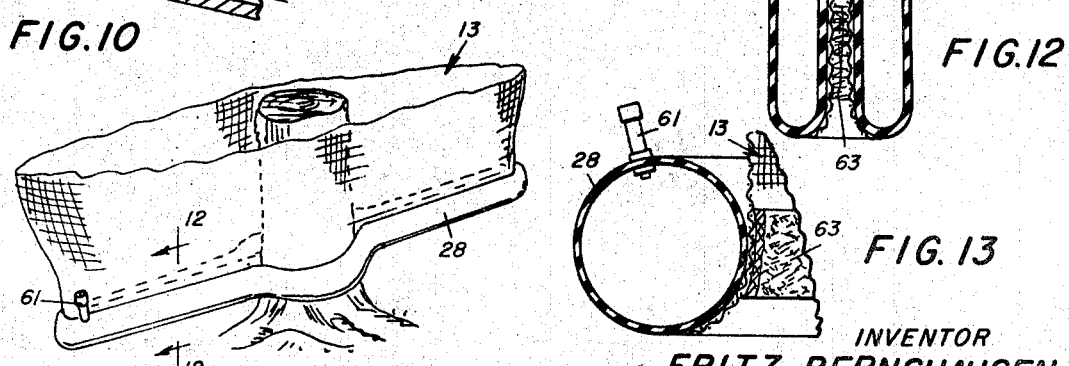

Dec. 8, 1970  F. BERNSHAUSEN  3,545,182
METHOD OF HARVESTING FRUIT
Filed Feb. 21, 1968  4 Sheets-Sheet 4
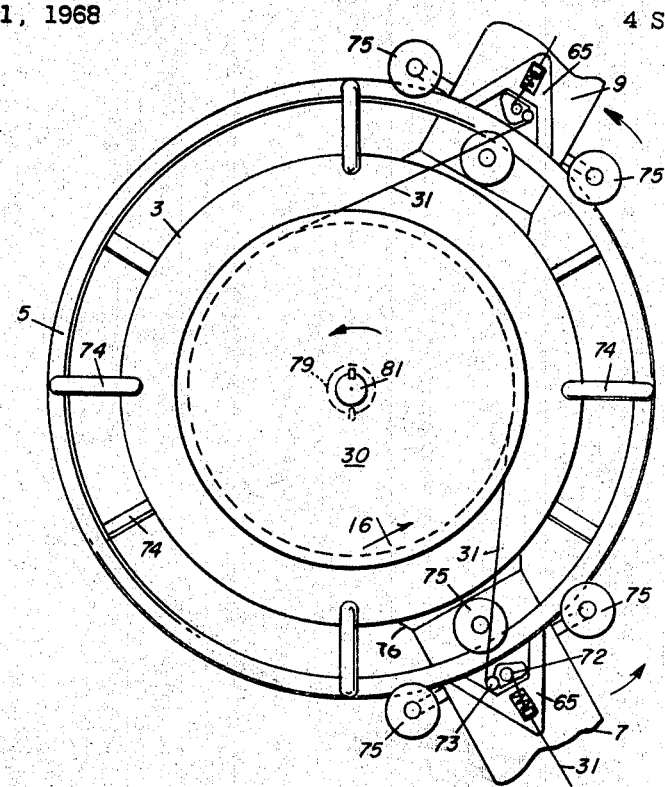
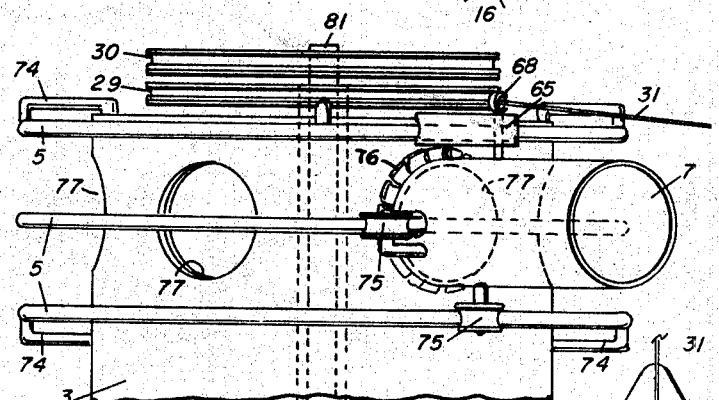
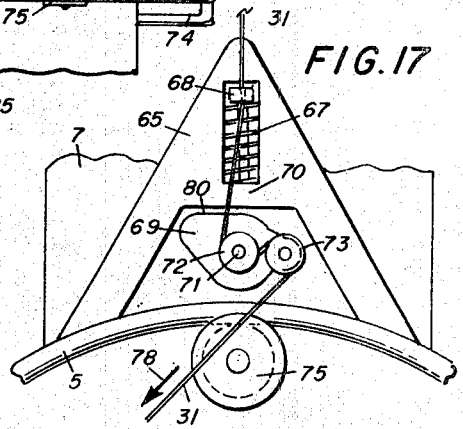
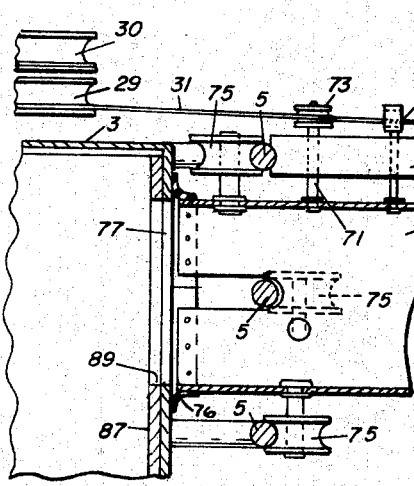
INVENTOR
FRITZ BERNSHAUSEN
BY Beall and Jones
ATTORNEYS 3,545,182
METHOD OF HARVESTING FRUIT
Fritz Bernshausen, 1109 W. G St.,
Elizabethton, Tenn. 37643
Filed Feb. 21, 1968, Ser. No. 707,237
Int. Cl. A01g 19/00
U.S. Cl. 56—1                                    7 Claims

ABSTRACT OF THE DISCLOSURE

A tree fruit harvesting system is provided wherein a flexible air-permeable container is positioned over a fruit tree and the container is filled with particulate cushioning material, so that when the fruit is detached from the tree by some means such as shaking, the fruit does not fall and incur surface bruises. A retriever member is provided for attachment to the bottom of the container to facilitate the removal of fruit and cushioning material from the container. The system includes a second, identical container for positioning over a second fruit tree, means for conveying the cushioning material from the first container to the second container, and means for transferring the containers from tree to tree, whereby the harvesting operation is performed sequentially on each tree in a row.

BACKGROUND OF THE INVENTION

This invention relates to a tree fruit harvesting method and apparatus, and more particularly relates to a system whereby bruise susceptible fruit is cushioned during harvesting so that it will not be subject to bruise producing impacts which impair the marketability of such fruit.

Heretofore, in order to preserve the quality of such fruit during harvesting, it has been necessary to pick the fruit by hand, with all the attendant disadvantages of manual labor, such as high cost and low efficiency. Prior mechanical harvesters have been proposed, but have been successful only for limited uses.

It is well known in the prior art to mechanically shake the limbs of a tree, or the entire tree, to dislodge fruit from the branches, and such mechanical shakers are now quite common. Where they are used in harvesting a relatively sturdy crop, such as nuts, such shakers are quite successful, as the nuts may be allowed to drop from substantial heights without damage. However, where the crop has a soft surface susceptible to bruising, the damage incurred as the fruit drops to the ground, perhaps striking branches during its fall, can substantially decrease its market value.

To prevent harvested fruit from striking the ground, and to facilitate gathering the fruit, various catching frames have been proposed for placement under the tree to catch the fruit and to channel it to a central point for packing. In some instances, these frames provide little more shock absorbing characteristics than the ground, and thus do not effectively prevent harm to the fruit. In other systems, shock absorbing devices, such as multiple parallel strips of flexible material extending across the frame are provided to slow the falling fruit before it strikes the frame. The support members for these strips are quite cumbersome, however, and as the diameter of the trees to be harvested increases, the appropriately sized catching frame becomes both more expensive and more difficult to maneuver in an orchard. Although such devices do reduce bruising of the fruit when the fruit strikes the catching frame, they do not eliminate the damage caused when the fruit strikes fruit already on the catching frame, or strikes branches of the tree during its fall to the catching frame. In order to reduce to a minimum these latter forms of damage, it is necessary that tree heights be confined by pruning to a maximum height of about 15 feet, thus limiting the length of fall of the fruit through the tree from the uppermost branches, but also limiting the maximum amount of fruit that can be produced by a single tree.

SUMMARY OF THE INVENTION

The invention comprises a system by which fruit to be harvested from a tree is entirely surrounded by a cushioning material, so that when the fruit is detached from the tree by some means, such as a mechanical tree shaker, the fruit is suspended in the cushioning material and does not fall through the tree and become bruised by striking the ground or by striking branches during its fall. A large container with air permeable walls surrounds the tree and is completely filled with the cushioning material. After the fruit has been separated from the branches, the cushioning material is pneumatically conveyed from a rigid retriever member which is removably attached to the bottom of the large container by a pneumatic closure member. Alternatively, the fruit may be separated from the branches simultaneously with the start of removal of the cushioning material from the container, as fruit on the topmost branches not surrounded by cushioning material will fall only a short distance and will be arrested gently by the upper level of the cushioning material. As the cushioning material is removed from the container, the fruit settles gently to the bottom of the retriever and may either collect there for later removal, or may roll by gravity through an opening in the retriever to some appropriate collecting means.

In the embodiment of the invention described, a second identical container is lowered around the adjacent tree in the row of trees to be harvested, as in an orchard or the like. This second container is not provided with the rigid retriever member of the previous container, but is closed at the bottom by the pneumatic closure member. Means are provided to permit the cushioning material which is pneumatically conveyed from the first container to be blown into the second container. When harvesting of the fruit from the initial tree has been completed, the rigid retriever member and the mechanical shaker are withdrawn from the first tree and placed under the second tree. The pneumatic closure member on the second container is opened and engaged with the rigid retriever member, the shaker is activated, and the harvesting procedure begins on the second tree. During this procedure, the initial container is lifted away from the harvested tree and placed over a third tree. The pneumatic closure member seals the bottom of the container so that the first container may accept cushioning material now being conveyed from the second container, and the harvesting cycle is complete.

The entire harvesting mechanism may be mounted on some sort of a mobile vehicle, for example a flat bed truck, so that it may be transferred from tree to tree much more readily than the catching frames of the prior art. The tree size that may be accommodated by the harvesting system is limited only by the size of the cushioning material container. As this container is constructed merely of a lightweight, air-permeable fabric and a simple support frame, it may be expanded to accommodate larger trees than those accommodated by prior art devices with with a minimum of expense and modification to the support structures. Thus, the invention not only allows fruit to be harvested without bruising, but allows tree heights and diameters to be increased to allow greater fruit production in a given orchard.

The foregoing and other objects and features of the invention will be appreciated from a study of the drawings and of the following detailed description, which illustrates a preferred embodiment of the many possible embodiments of the invention.

BRIEF DESCRIPTION OF THE DRAWINGS

FIG. 4 is a rear elevation of the preferred embodiment of the invention.

FIG. 5 is an enlarged cutaway detail of the end portion of a shroud boom.

FIG. 6 is an enlarged section of the container support ring taken along line 6—6 of FIG. 1.

FIG. 7 is an enlarged top plan view of the retriever member of this embodiment of the invention.

FIG. 8 is a section of the retriever member taken along line 8—8 of FIG. 7.

FIG. 9 is a section of the retriever member taken along line 9—9 of FIG. 7.

FIG. 10 is a sectional view of an alternative construction of the receiver bottom surface.

FIG. 11 shows in perspective the shroud closure member in a closed position.

FIG. 12 is a section of the shroud closure member generally along line 12—12 of FIG. 11, with the closure member in the deflated and closed position.

FIG. 13 is an enlarged section similar to FIG. 12 of the shroud closure member showing one side of the closure member in an inflated and open position.

FIG. 14 is a plan view of the top of the central support column of this embodiment of the invention.

FIG. 15 is an elevation view of the upper portion of the central support column of this embodiment of the invention.

FIG. 16 is a section taken along line 16—16 of FIG. 14, showing the method of mounting the shroud support boom to the central support column.

FIG. 17 is a detail of the brake mechanism for holding the shroud support boom in a fixed position relative to the central support column as shown generally in FIG. 14.

Like parts of the embodiment of the invention are designated by the same number in all of the drawings and in the specification.

DESCRIPTION OF A PREFERRED EMBODIMENT OF THE INVENTION

Figures 1, 2, 3:
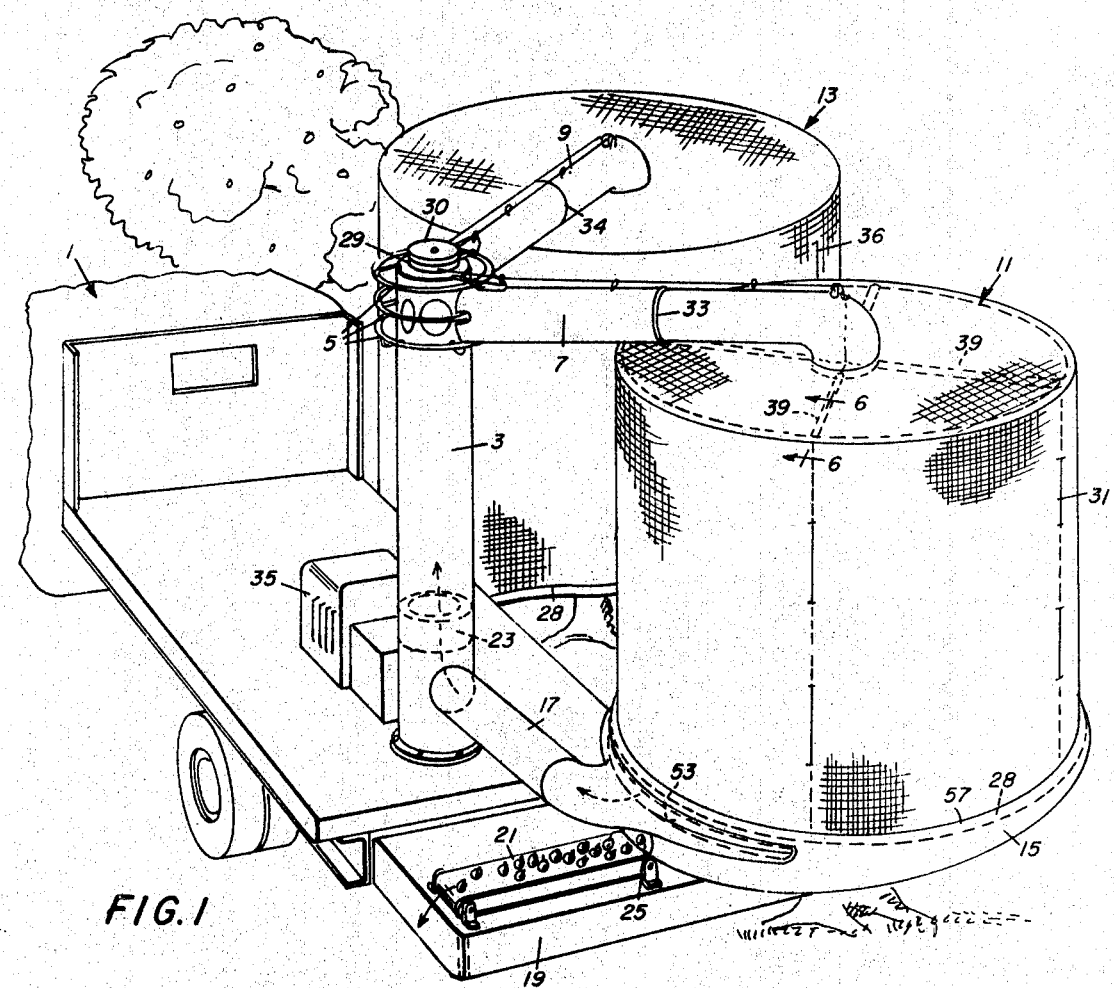
FIG. 1 is a perspective view of a preferred embodiment of the present invention.
FIG. 2 and FIG. 3 show diagrammatically the operation of the embodiment of FIG. 1 as it moves along a row of fruit trees.

With reference to FIG. 1, the preferred embodiment of the invention comprises, in general, a truck 1, a central support column 3 mounted on the truck 1, circular rails 5 attached to the top of the column 3, cantilevered container support booms 7, 9 mounted on rails 5 for rotation in a horizontal plane about the top of the column 3, flexible wall containers, or shrouds, 11, 13 supported by booms 7, 9, a fruit retriever member 15 which may be attached to the bottom of either container 11 or 13, and a flexible conduit 17 between the retriever 15 and the base of the central column 3. Also attached to the truck 1 is a tree shaker 19, which may be one of the commercial tree shakers presently on the market, and a belt conveyor 21 to convey harvested fruit from the retriever to a suitable receptacle. The retriever 15 is mounted on telescoping shaker 19 so that both may be extended to or withdrawn from a tree.

In operation, container 11 is initially placed around a fruit tree and is completely filled with a light particulate cushioning material, such as shredded foam rubber or shredded styrofoam. A granular form of polystyrene marketed under the trade name "Gen-A-Lite" by the General Foam Plastics Corp. would be suitable. Container 13 is placed around the adjacent tree, but is not filled with cusioning material. Shaker 19 is engaged with the base of the tree in container 11 and is activated, and the resultant shaking imparted to the tree causes the fruit to separate from the branches. Upon separation, however, the fruit does not fall, but is suspended and maintained in position by the surrounding cushioning material. To retrieve the fruit at the end of the shaking operation, a fan 23 mounted in the central column 3 is operated to induce a flow of air from the retriever member 15 through the flexible conduit 17, thus pneumatically conveying the cushioning material from the bottom of container 11. As the cushioning material is withdrawn, the suspended fruit is gently lowered to the floor of the retriever 15 and moves by gravity to opening 25 and onto conveyor 21. Opening 25 may be open so that the fruit rolls onto conveyor 21 as soon as the fruit reaches the retriever bottom, or the opening 25 may be closed so that fruit is collected in retriever 15 to be removed after the cushioning material has been fully transferred from container 11. As the cushioning material is withdrawn from retriever 15 through flexible conduit 17, it is conveyed by fan 23 up the inside of column 3, out through the interior of container support boom 9 and is deposited in the second shroud, or container, 13, filling container 13 as container 11 is emptied. In the absence of the fruit retriever 15, container 13 is closed at the bottom by an integral pneumatic closure 28, explained below.

When container 11 is completely emptied of the cushioning material and the harvested fruit, retriever 15 and shaker 19 are disengaged and withdrawn from the tree, the flexible side walls of container 11 are raised by means of pulley 29 and shroud lines 31, and, as is shown diagrammatically in FIG. 2 and FIG. 3, boom 7 rotates around column 3 as the truck advances the distance of a single tree interval down the row. Retriever 15 is moved under and around the bottom of container 13, pneumatic closure member 28 is opened to fasten the bottom of container 13 to retriever 15, and shaker 19 is attached to the tree surrounded by container 13. Container 11 is lowered over a new tree and the harvesting cycle begins anew. Booms 7 and 9 include respective telescoping joints 33 and 34 to facilitate transfer and placement of the containers 11 and 13 over the trees. Container 13 is supported by shroud lines 36 wound on reel 30, similar to the arrangement whereby container 11 is supported by shroud lines 31. Fan 23 and reels 29, 30 are operated by suitable power means 35.

The engagement of shaker 19 and retriever 15 about the base of a tree is more clearly seen in FIG. 4. In this view, the shaker 19 and retriever 15 are shown spaced rather widely from one another for ease of understanding the invention. In practice, retriever 15 is mounted on, or closely adjacent to, shaker 19 and the entire assembly is built as close to the ground as is possible, as many types of fruit trees have low branches and container 11 and retriever 15 must pass under the lowest branches.

Container 11 is constructed of flexible, air permeable material, such as a loosely woven fabric, which is supported and given form by a container support ring 37. Container support ring 37 is suspended from boom 7 by means of a plurality of hollow, horizontal support members 39. Shroud lines 31, attached to the bottom edge of container 11, are laced upwardly through the walls of container 11, pass through ring 37 and horizontal support members 39, are gathered together by flared tube 41, as shown in FIG. 5 and FIG. 6, and pass over idler pulley 43 to reel 29 on the central column 3. Thus, when reel 29 is operated to reel up the lines 31, the wall of container 11 is lifted from around the tree and is gathered at the support ring 37. Boom 7 may then be rotated in a horizontal plane around column 3, swinging the entire container assembly away from the first tree and positioning it over a new tree, as in FIG. 3, and unreeling of lines 31 from reel 29 lowers the container 11 over the new tree. The support system for container 13 is constructed and operated identically to that for container 11.

Retriever 15, as shown in detail in FIGS. 7, 8 and 9 is circular in a horizontal plane so as to mate with either cylindrical container 11 or 13, and has a sloping bottom surface so that fruit reaching the bottom at any point will roll to opening 25. Radial slot 45 (FIG. 7) is provided to allow passage of the tree trunk in positioning the retriever 15 around the trunk of a tree. Slot 45 is closed by flexible leaves 47, 48, which may be of rubber. Flexible gasketing 49 is also provided around the central opening 51 accommodating the tree trunk. During harvesting, cushioning material is removed by means of the air stream through opening 53, which is equipped with grate bars 55 to prevent the egress of fruit. Overturned edge 57 is provided to receiver and hold either the closure member 28 of container 13 or the closure member 27 of container 11. Small holes, or perforations, 52 may be provided through the bottom of retriever 15, as is shown in FIG. 7, so that when the slight negative pressure is induced on the interior of container 11 or 13 and retriever 15 by the pneumatic conveying system, air will flow through the perforations 52 and across the bottom surface of retriever 15 to the opening 53, thereby assisting in sweeping cushioning material out of retriever 15. Alternatively, the receiver bottom surface may be constructed in two layers in the area of the perforations 52, as is shown in FIG. 10. Pressurized air may then be introduced by appropriate means into the channel between upper layer 54 and lower layer 56, which pressurized air will be discharged through perforations 52 to further assist in sweeping cushioning material in the retriever toward opening 53.

Closure members 27 and 28 of containers 11, 13 are flexible, inflatable, tube like members attached to the bottom edge of their respective containers. Each closure member is equipped with an air valve such as valve 61 illustrated on member 28, for inflation and deflation. When closures 27 or 28 are inflated, they assume the circular rigid form shown in FIGS. 8, 9 and 13 and will seat in the overturned edge 57 of retriever 15 to firmly attach container 11 or 13 to retriever 15. When, however, a closure 27 or 28 is deflated, it becomes flexible and may be formed around the bottom of a tree as is shown in FIGS. 11 and 12. Strips of self-adhering material 63 such as "Velcro" are provided around the interiors of the closures 27 and 28 to hold the bottom of their respective containers closed as long as the closures are deflated. Air relief holes may be provided along the interior circumference of the closures 28, 29 so that compressed air may be directed into the retriever 15 when closure 28 or 29 is inflated, thus assisting in removal of cushioning material similar to the operation of perforations 52 in the retriever 15. In this alternative structure, the closures 28 or 29 would be inflated by a continuous source of compressed air when their respective container 11 or 13 is attached to retriever 15.

Referring again to FIG. 1, closure 28 of container 13 is shown in the deflated position, and is molded around the base of a tree to seal the bottom of container 13, so as to prevent the loss of cushioning material being blown into container 13 through boom 9. When container 11 is emptied, retriever 15 is removed from container 11, as is described above, is placed under container 13, and closure 28 is inflated. This causes the sealing strip 63 to part, and the closure 28 assumes the circular rigid form of FIGS. 8 and 9, sealing container 13 to retriever 15 and readying container 13 for a harvesting operation.

The structure and mechanism by which the container support boom 7, 9, are mounted to the top of the central support column 3 is illustrated in FIGS. 14 through 17. Circular rails 5 are mounted at the top of column 3 and spaced away from the coulmn 3 by means of brackets 74. Container support booms 7, 9 are rollably mounted on rails 5 by rollers 75. Flexible gaskets 76 seal the space between the column 3 and the support booms 7, 9. Multiple ports 77 are provided in the top of support column 3 and rotatable interior sleeve 87, with a single opening 89 corresponding to the size of the openings 77, is mounted on the interior of column 3. By rotating interior sleeve 87 by some appropriate means, such as a geared transmission system extending to the outside of column 3, opening 89 may be aligned with any one of openings 77, thus allowing only that one opening 77 to communicate with the interior of column 3. Booms 7, 9 are each provided with brake systems to hold them in position on column 3.

The structure and operation of the container support boom brake system will be described with respect to support boom 7, although the brake on support boom 9 operates in an identical manner. Container support boom 7 is held in place by an A-shaped brake shoe 65 pressed against rail 5 by the force of spring 67 operating between pin 68 mounted on boom 7 and surface 70 of brake shoe 65. Cam 69 is rotatably mounted on pin 71 extending from boom 7 through a slot in the brake shoe 65. Also attached to pin 71 is a pulley 72. Idler pulley 73 is mounted eccentrically with respect to pin 71 on cam 69. Shroud lines 31 from the container 11 run through an eye on pin 68 and around both pulleys 73 and 72, as shown, and are wound on reel 29. Reel 29 is connected through a shaft 79, spur gear 83 and worm gear 85 to some suitable power driving means 35. Reel 30, on which is wound the shroud lines 32 from container 13, is likewise attached to power means 35 through shaft 81, spur gear 84 and worm gear 86. The worm gears 85 and 86 are selectively driven by the power means 35 to provide individual control of containers 11 and 13.

It will be recalled that the first step in transferring container 11 from one tree to another was to reel in shroud lines 31 on reel 29, thus raising and gathering the walls of container 11 from around the tree. This reeling action also serves to release brake 65 and cause boom 7 to rotate around column 3, in the following manner. Referring to FIG. 17, when lines 31 are reeled and thus are drawn in the direction of arrow 78, the moment created by the tension in shroud lines 31 in the pair of pulleys 72 and 73 tends to rotate cam 69 in a clockwise direction around the pivot defined by pin 71, the cam surface 80 thus tending to force brake shoe 65 away from rail 5. The force of spring 67 is adjusted so that the tension in shroud lines 31 required to release the brake shoe 65 is somewhat greater than the tension required to raise the container 11 from around the tree. Thus, after the container 11 has been fully raised away from the tree, an additional tension is imparted to the shroud lines 31 by the reel 29, so that the cam 69 moves brake shoe 65 away from rail 5 against the pressure of spring 67, and releases boom 7 for moment.

It will be observed that a component of the tension in the shroud lines 31 is in a direction tangential to rails 5, so that when the brake 65 is released, boom 7 may be rotated around the top of column 3 by maintaining the appropriate tension in shroud lines 31. In operation, after container 11 has been raised and brake 65 has been released, boom 7 is rotated around the column 3 until the raised container 11 is positioned over a new tree, and the boom 7 is positioned over one of the openings 77. The tension in shroud lines 31 is then released by unwinding reel 29, brake 65 sets to hold boom 7 in the new position and container 11 is lowered over the new tree. Interior sleeve 87 is rotated so that its opening 89 corresponds with the opening 77 over which the boom 7 is positioned. The sleeve 87 seals all other openings 77, so that the cushioning material being blown up through column 3 during a harvesting operation in container 13 passes out through boom 7 into the newly positioned container 11.

It will be noted that the direction of boom rotation is illustrated as being counterclockwise in FIG. 14 and clockwise in FIGS. 1 and 2. A change in direction of boom rotation is effected merely by removing brake cam 69 from pin 71, rotating it 90° in a horizontal plane before replacing it on pin 71, wrapping shroud lines 31 in the opposite direction around cam pulleys 71 and 73, and winding shroud lines 31 in the opposite direction around reel 29.

This constitutes a general description of but one embodiment of the invention, and modifications will be ob-

I claim:

1. A method of harvesting tree fruit comprising the steps of:
   surrounding said fruit with particulate cushioning material;
   and detaching said fruit from said tree, whereby said fruit, after being detached from said tree, is suspended in said cushioning material, thereby preventing said fruit from falling freely to the ground and preventing said fruit from being bruised during harvesting.

2. The method of claim 1, in which said fruit is separated from said cushioning material after said fruit is detached from said tree.

3. The method of claim 2, in which the step of surrounding said fruit with said cushioning material includes enclosing the fruit tree in a container and filling said container with cushioning material, and in which said fruit and said cushioning material are removed from said container after said fruit is detached from said tree.

4. The method of claim 3, in which the step of removing said cushioning material from said container includes:
   pneumatically conveying said cushioning material from said container;
   and pneumatically transferred said cushioning material to a second container enclosing a second tree.

5. The method of claim 4, in which the step of detaching said fruit from said tree comprises mechanically shaking said tree.

6. The method of claim 4, in which the step of separating said cushioning material from said fruit comprises:
   pneumatically conveying said cushioning material from said container through a first opening in a retriever member removably attached to said container;
   and removing the fruit through a second opening in said retriever member.

7. The method of claim 6, with the additional subsequent steps of:
   detaching said retriever member from first said container;
   transferring and attaching said retriever member to said second container;
   removing said first container from said first tree;
   and transferring said first container to a third tree, whereby after the fruit on said second tree is harvested, said cushioning material is pneumatically conveyed from said second container to said first container.

References Cited

UNITED STATES PATENTS

| | | | |
|---|---|---|---|
| 1,137,545 | 4/1915 | Shaffer | 56—30 |
| 2,689,439 | 9/1954 | Martin | 56—12 |
| 2,996,868 | 8/1961 | Voelker | 56—328 |
| 3,114,998 | 12/1963 | Weisser | 56—329 |

RUSSELL R. KINSEY, Primary Examiner